(No Model.) 6 Sheets—Sheet 1.

T. EVANS.
MALT MASHING MACHINE.

No. 384,568. Patented June 12, 1888.

WITNESSES:
Chas. Wahlers.
Hermann Ramberger.

INVENTOR:
Thomas Evans.
BY Adam E. Schatz,
ATTORNEY.

(No Model.)

6 Sheets—Sheet 2.

T. EVANS.
MALT MASHING MACHINE.

No. 384,568.  Patented June 12, 1888.

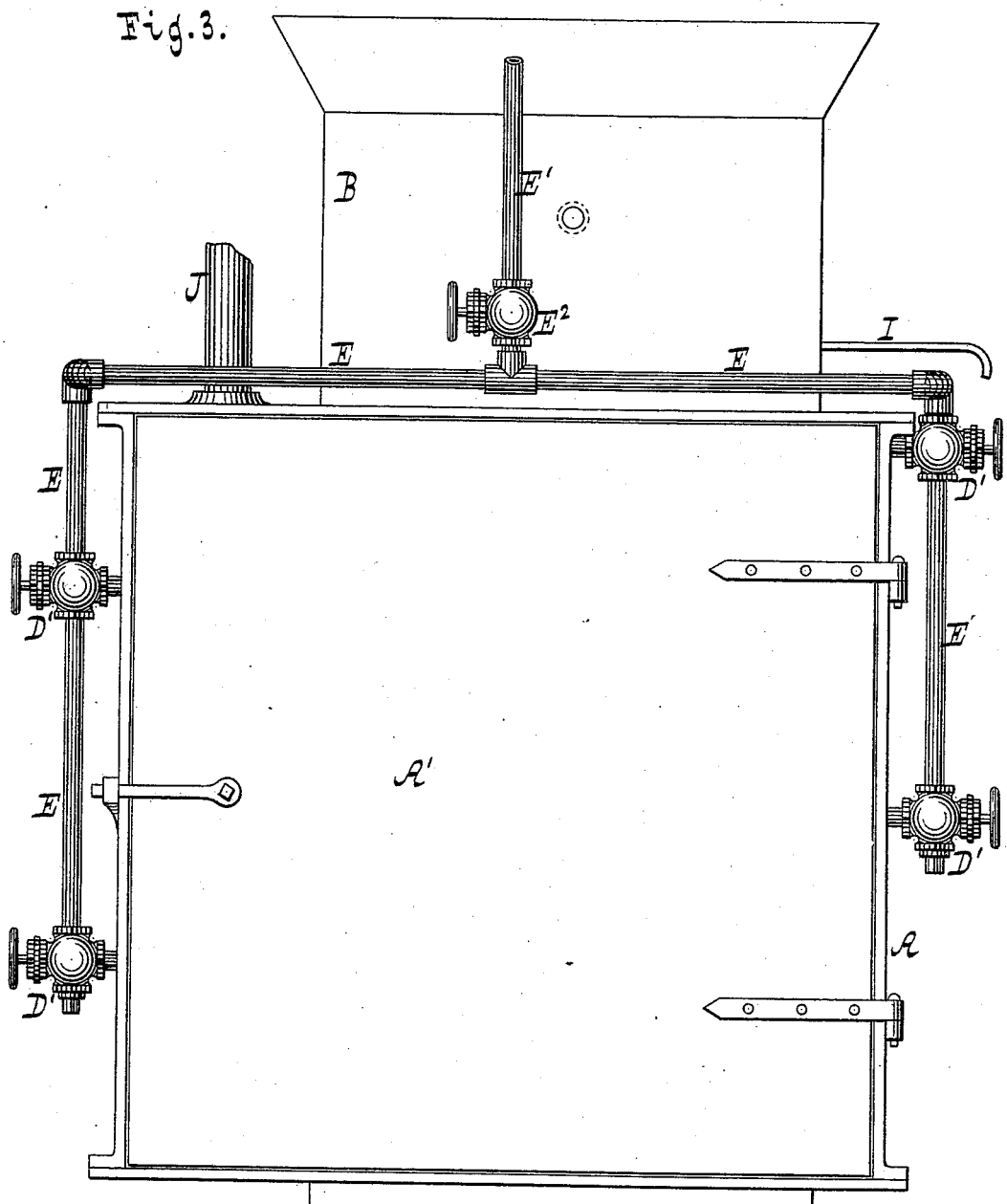

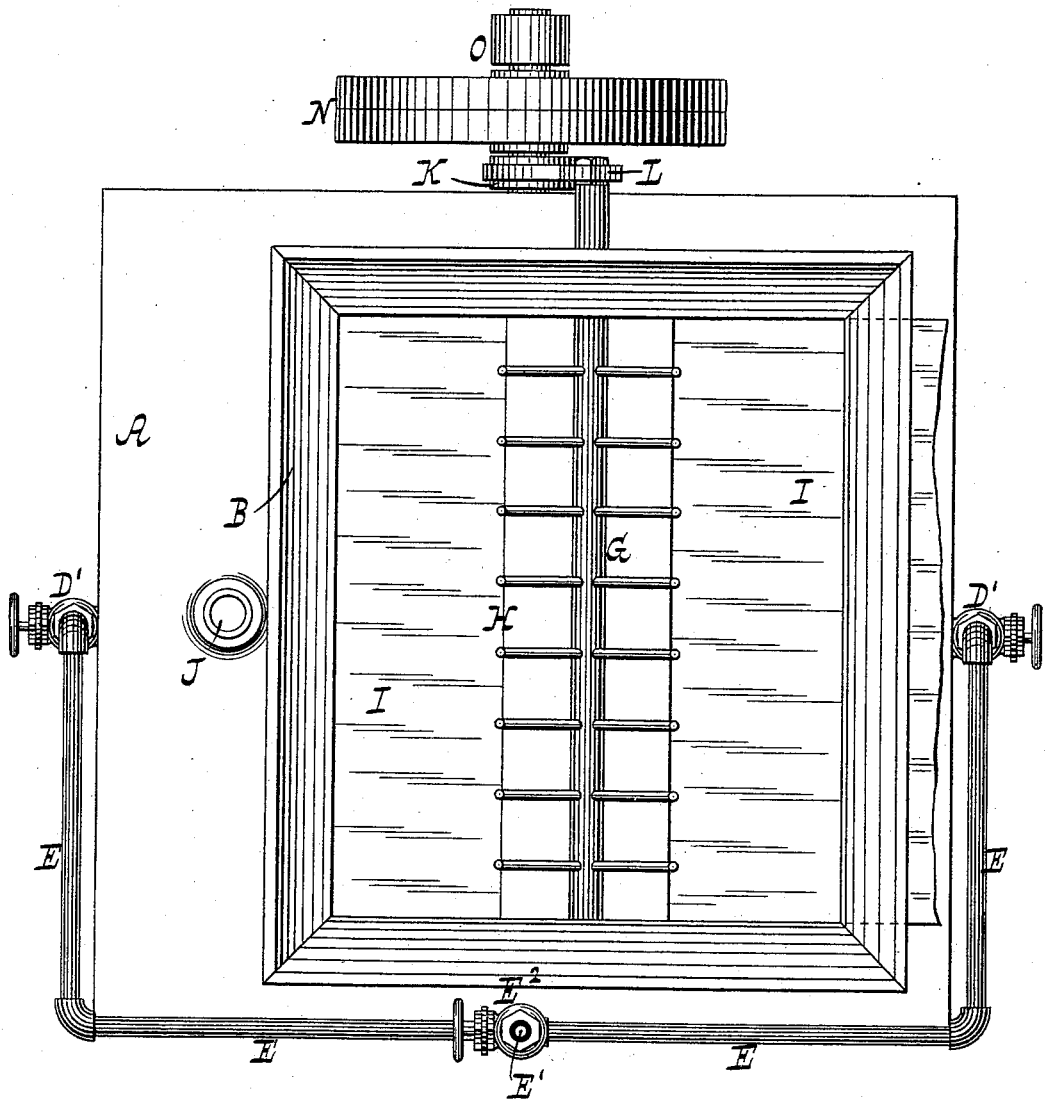

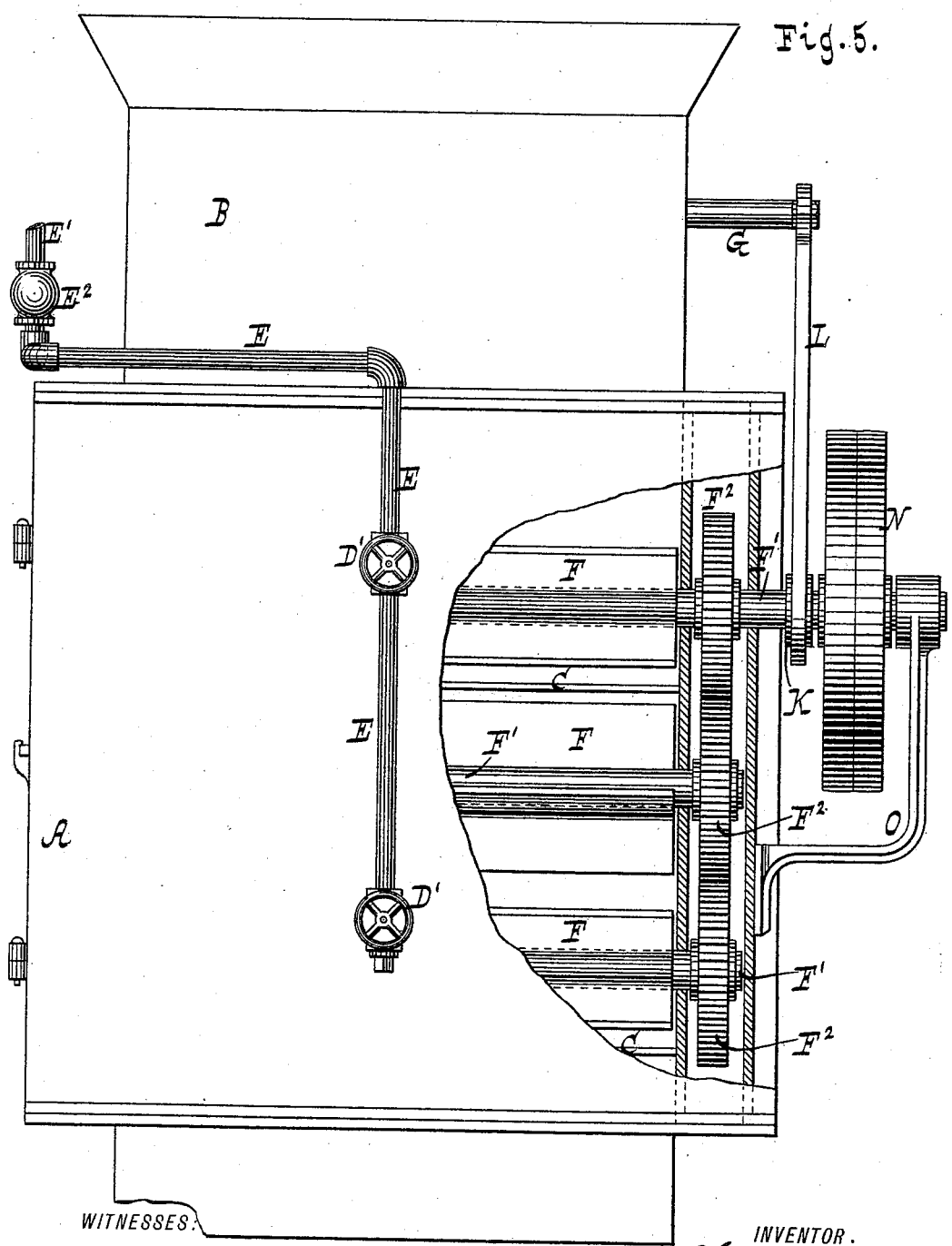

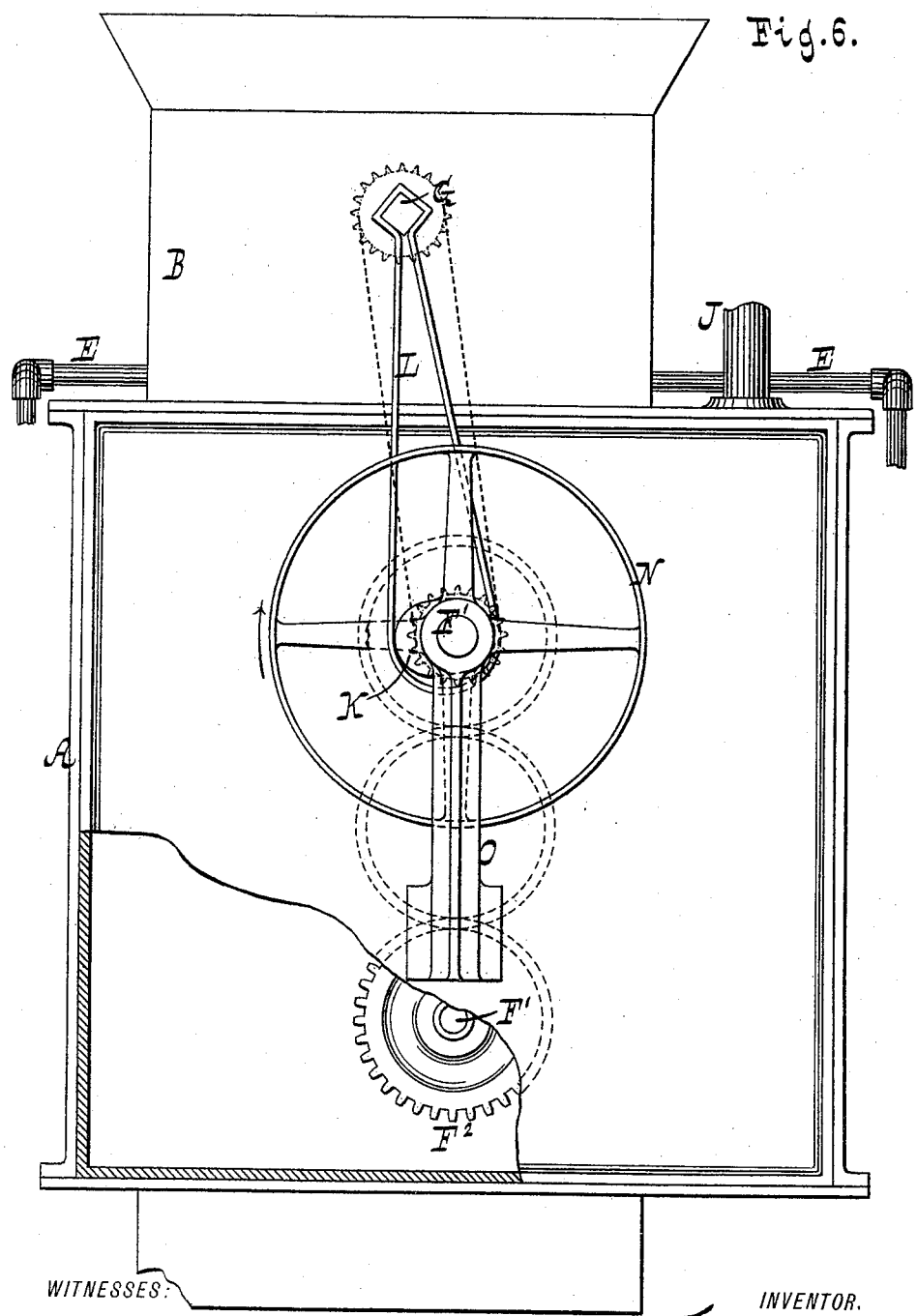

UNITED STATES PATENT OFFICE.

THOMAS EVANS, OF NEW YORK, N. Y.

MALT-MASHING MACHINE.

SPECIFICATION forming part of Letters Patent No. 384,568, dated June 12, 1888.

Application filed October 19, 1886. Serial No. 216,635. (No model.)

*To all whom it may concern:*

Be it known that I, THOMAS EVANS, a citizen of the United States of America, and a resident of the city, county, and State of New York, have invented a new and useful Improvement in Mashing-Machines, of which the following is a specification.

My invention relates to mashing-machines to be used in the manufacture of beer or ale; and it consists in the novel features of construction, hereinafter described, whereby a very effective mashing operation may be produced with economy of time and labor.

My invention is illustrated in the accompanying drawings, in which—

Figure 1:
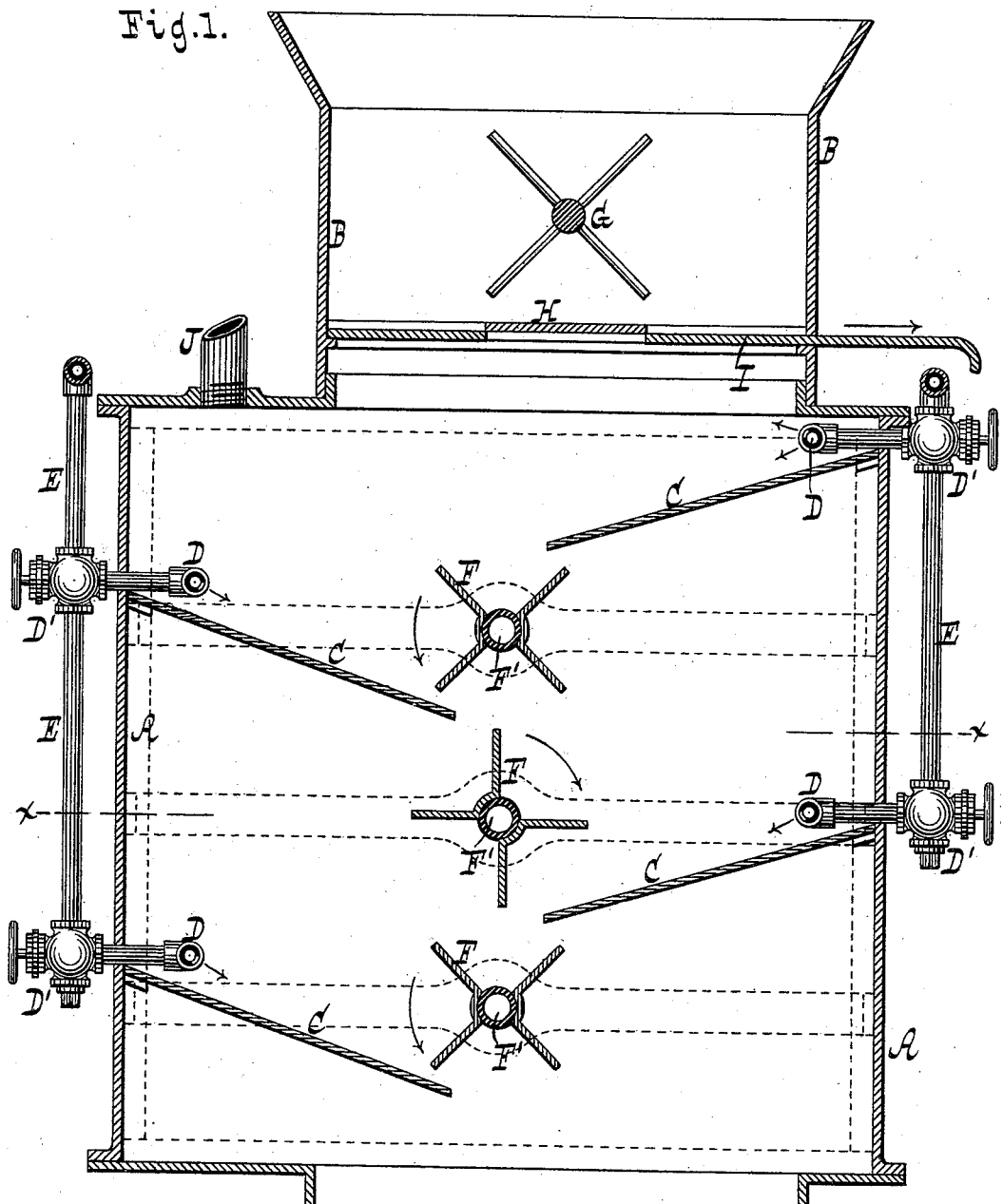
Figure 2:
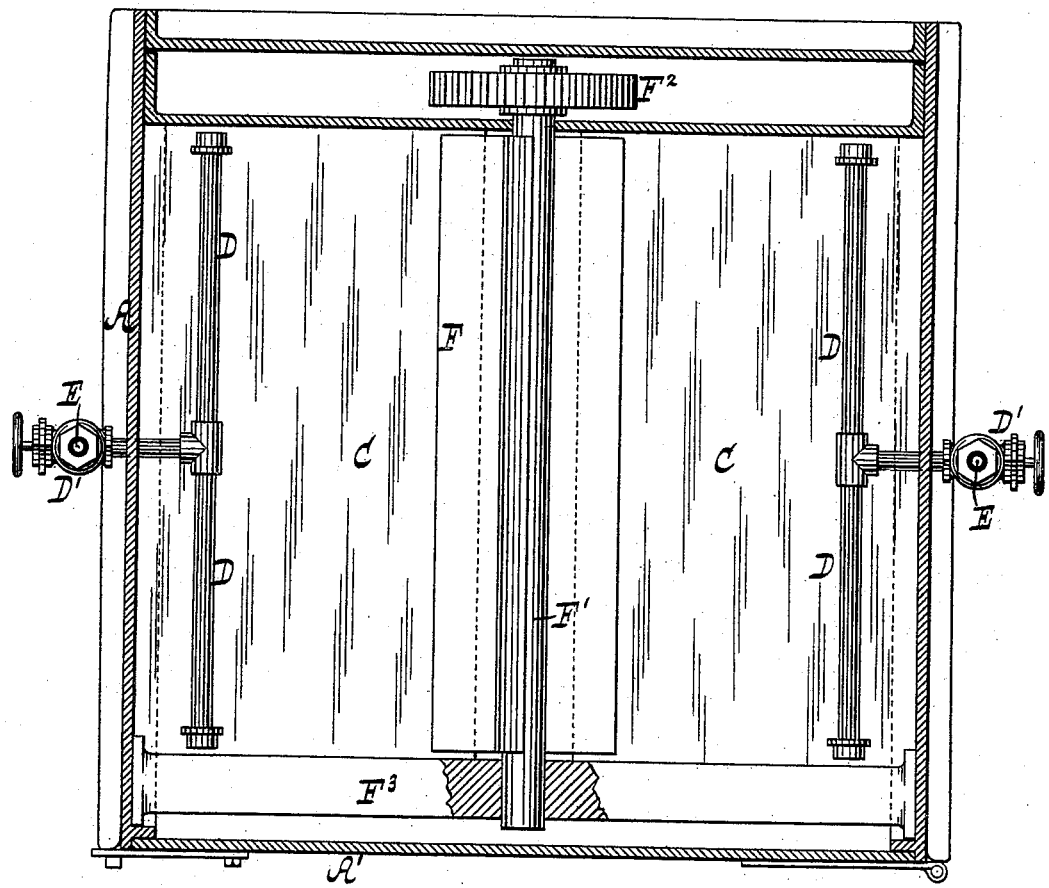
Figure 2:

Figure 1 represents a vertical cross-section. Fig. 2 represents a horizontal section on the line *x x*, Fig. 1. Fig. 2* represents a front view of a water-distributing pipe detached. Fig. 3 represents a front view; Fig. 4, a plan or top view. Fig. 5 represents a side view, partly in section. Fig. 6 represents a rear view, partly in section.

Similar letters indicate similar parts.

The letter A designates the body of the mashing-chamber having a door, A', to afford access to the interior thereof, and B designates a hopper connected to the top of said chamber, it being open both at the top and bottom.

C designates a series of chutes, which extend from opposite sides of the mashing-chamber on an inwardly and downwardly inclined plane, alternately one below the other, and each of which terminates at a point about the middle of said chamber.

D indicates a series of perforated water-distributing pipes, which extend in a direction lengthwise to the inclined chutes C, above and at or near the higher portions of the latter— one to each chute—and which are provided, respectively, with a valve, B, exterior of the machine.

E designates water-supply pipes, which are connected to said valves of the distributing-pipes, and also connected with a common service-pipe, E, having a valve, $E^2$.

The letter F designates paddle-wheels, which are intermediate of the inclined chute C in the mashing-chamber—that is to say, said wheels are in horizontal positions, respectively, below the lower end or portion of one chute, and above the corresponding portion of the chute next below and opposite thereto, as shown in Fig. 1. The blades of the paddle-wheels F extend approximately the length of the inclined chutes C, and the shafts F' thereof have their bearing at one end in a cross-bar, $F^3$, (see Fig. 2,) and at the other end in the rear of the mashing-chamber, the series of shafts being geared together by cog-wheels $F^2$, and the shaft of the upper paddle-wheel being provided with pulleys N, so that a revolving motion may be imparted to the wheel-shafts and wheels alternately in opposite directions, as indicated by arrows in Fig. 1. An additional bearing is afforded to the upper wheel-shaft, F, by means of a bracket, O, properly secured to the rear of the mashing-chamber.

The letter G designates an agitator in the hopper B, the same being composed of a horizontal shaft and suitable arms projecting radially therefrom.

H designates a horizontal partition in the lower portion of the hopper B, with openings on opposite sides of the agitator G, and I designates a sliding gate below said partition. The shaft of the agitator G passes through one side of the hopper B, and to the outer end or portion thereof is connected one end of a vibrating arm or frame, L, (best seen in Fig. 6,) the other end of which engages with an eccentric, K, on the upper wheel-shaft, F', whence it derives its motion, the effect being to impart to the agitator a reciprocating motion. If desired, however, a revolving motion may be imparted to the agitator—as, for example, by means of a chain and chain-wheels, as indicated by dotted lines in Fig. 6.

The letter J designates a tube, which is connected to the top of the mashing-chamber independently of the hopper B, for the introduction of material which it may be desired to mix with the malt to facilitate the mashing operation, or for other purposes.

When the apparatus is applied to use, the malt is put into the hopper B, whence it discharges into the mashing-chamber, the gate I being properly adjusted, and the proper valves are opened to supply the distributing-pipes D with water, which may or may not be under pressure, and which escapes from the distributing-pipes in jets, the direction of which may be regulated by a proper arrangement of the perforations in said pipes. In the example shown the uppermost water-distributing pipe, B, has its perforations above and below a horizontal line, as shown in Fig. 2, to discharge in both an upward and downward direction, while the remaining water-distributing pipes have their perforations below a horizontal line to discharge in a downward direction, as indicated by arrows in Fig. 1. The paddle-wheels F, together with the agitator G, are now put in operation, and as the malt is deposited on the inclined chutes C successively it is permeated by the water escaping from the distributing-pipes D, while by the action of the paddle-wheels F the wet malt is not only thrown from one to another of the inclined chutes, but also thoroughly agitated, with a tendency to bring the entire mass in contact with the water, so that the malt leaves the mashing-chamber—namely, at the bottom thereof—in the state of a perfect mash. By the position of the pipes D a very effective distribution of the water is produced, inasmuch as the water is directed inward from opposite sides of the mashing-chamber and into or against the portion of malt resting on the inclined chutes; but, if desirable, said pipes may be arranged at other points in relation to the chutes with a good result—as, for example, below the lower ends of the chutes. By the valves D' the amount of water supplied to the distributing-pipes D can be controlled with nicety, so that the amount of water supplied to successive pipes may be increased or decreased, as may be deem expedient.

It will be seen that by the construction of this machine a clear or unobstructed passage is afforded to the malt, so that the danger of clogging is obviated, while a very effective operation is produced with the least expenditure of time and labor.

What I claim as new, and desire to secure by Letters Patent, is—

1. In a mashing-machine, a series of inclined chutes on opposite sides of the mashing-chamber, alternately one below the other, a water-supply, and a series of paddle-wheels intermediate of said chutes, the whole combined substantially as and for the purpose herein described.

2. In a mashing-machine, a series of inclined chutes on opposite sides of the mashing-chamber, alternately one below the other, a series of water-distributing pipes extending lengthwise to said chutes above and at or near the higher portions thereof, and a series of paddle-wheels intermediate of said chutes, the whole combined substantially as and for the purpose herein described.

3. In a mashing-machine, a series of inclined chutes, a series of water-distributing pipes, each provided with a valve, and water-supply pipes connected to said valves, the whole combined substantially as and for the purpose herein described.

In testimony that I claim the foregoing as my invention I have signed my name, in presence of two witnesses, this 4th day of October, 1886.

THOMAS EVANS.

Witnesses:
A. H. LUTHER,
GEO. E. FISHER.